United States Patent
Kokura (10) Patent No.: US 11,922,598 B2
(45) Date of Patent: Mar. 5, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Toru Kokura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 375 days.

(21) Appl. No.: 17/346,519

(22) Filed: Jun. 14, 2021

(65) Prior Publication Data
US 2021/0398247 A1 Dec. 23, 2021

(30) Foreign Application Priority Data
Jun. 22, 2020 (JP) .................................. 2020-106853

(51) Int. Cl.
*G06T 3/40* (2006.01)
(52) U.S. Cl.
CPC .................................. *G06T 3/4015* (2013.01)
(58) Field of Classification Search
CPC ..... G06T 3/4015; G06T 3/4007; G06T 5/002; G06T 5/009; H04N 19/503; H04N 9/73; H04N 9/30; H04N 9/64; H04N 23/843; H04N 1/00132; H04N 1/41
See application file for complete search history.

(56) References Cited

U.S. PATENT DOCUMENTS

| | | | |
|---|---|---|---|
| 2010/0195929 A1* | 8/2010 | Inoue | H04N 1/00453 382/274 |
| 2015/0201108 A1* | 7/2015 | Banno | H04N 1/40 358/474 |
| 2015/0334296 A1 | 11/2015 | Gunji | |
| 2016/0105632 A1 | 4/2016 | Endo | |
| 2020/0202496 A1 | 6/2020 | Kokura | |
| 2020/0258196 A1 | 8/2020 | Kokura | |

(Continued)

FOREIGN PATENT DOCUMENTS

| | | |
|---|---|---|
| CN | 1417745 A | 5/2003 |
| CN | 101266743 A | 9/2008 |

(Continued)

OTHER PUBLICATIONS

Chinese Office Action issued in corresponding CN Patent Application No. CN202110690303.0, dated Sep. 5, 2023, with English Translation.

*Primary Examiner* — Charles T Shedrick
(74) *Attorney, Agent, or Firm* — Carter, DeLuca & Farrell LLP (57) ABSTRACT

In an image processing system in which development processing is applied to a RAW image in a server apparatus and results thereof are provided to a client terminal, the capacity of image data that is transmitted to the client terminal is reduced. The client terminal applies low-load development processing to an input RAW image and stores and displays the results image thereof. On the other hand, the server generates a difference image between both results images by applying the low-load and high-load development processing and provides the difference image to the client terminal. Then, based on the difference image, the client terminal reproduces a results image of the high-load development processing.

23 Claims, 9 Drawing Sheets

(56) References Cited

U.S. PATENT DOCUMENTS

2020/0304799 A1\* 9/2020 Streater .................. H04N 19/86
2021/0358081 A1 11/2021 Kokura
2021/0398247 A1\* 12/2021 Kokura ................. G06T 3/4015

FOREIGN PATENT DOCUMENTS

| CN | 101378511 A | 3/2009 |
|---|---|---|
| CN | 101727482 A | 6/2010 |
| CN | 104796600 A | 7/2015 |
| CN | 105144700 A | 12/2015 |
| CN | 107665128 A | 2/2018 |
| CN | 109658338 A | 4/2019 |
| CN | 111028213 A | 4/2020 |
| JP | 2012-95351 A | 5/2012 |

\* cited by examiner

IMAGE PROCESSING APPARATUS, IMAGE PROCESSING METHOD, AND STORAGE MEDIUM

BACKGROUND OF THE INVENTION

Field of the Invention

The present disclosure relates to development processing of a RAW image.

Description of the Related Art

To an image capturing element (image sensor) that is utilized in an imaging device such as a digital camera, a color filter is attached and the configuration is such that light of a specific wavelength enters each pixel. Processing to convert an image (RAW image) obtained by performing image capturing with the imaging device such as this into a color image that a person can appreciate as a photo is called "development processing". In general, the higher the quality that is required for the results of the development processing, the higher the calculation cost thereof becomes. Consequently, there is known a method of attaining both an increase in speed and quality of the processing by preparing a server having a large number of calculation resources and applying the development processing on the server. In the processing system such as this, a user transmits RAW image data to the server and receives results of the development processing from the server and displays a color image on a digital camera having performed image capturing or a PC (in the following, called "client terminal"). In a case where the image data of the development results is transmitted and received between the server and the client terminal as described above, not a short wait time occurs until it is made possible for a user to browse the development results on the screen of the client terminal. As a method of dealing with the wait time, a method of displaying a reduced preview image on the screen of the client terminal until the development results are received from the server has been proposed (Japanese Patent Laid-Open No. 2012-95351).

However, with the technique of Japanese Patent Laid-Open No. 2012-95351 described above, the larger the amount of data of development results, the longer the time that is required for transmission and reception becomes, and therefore, particularly in a case where batch processing is performed for a plurality of RAW images on the server, the development results that are desired to be displayed originally are not displayed for a while. Further, it is necessary to store the development results in the server until the processing to transmit the development results from the server to the client terminal is completed, but the larger the amount of the data, the more the load is imposed on the storage capacity of the server.

SUMMARY OF THE INVENTION

The image processing apparatus according to the present disclosure includes: a development unit configured to apply development processing to an input RAW image; an acquisition unit configured to acquire a difference image indicating a difference between a first results image obtained by applying first development processing the same as the development processing to the RAW image and a second results image obtained by applying second development processing different from the first development processing to the RAW image; and a generation unit configured to generate a third results image by applying development processing to the RAW image based on the first results image and the difference image.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In the present embodiment, the client terminal not only transmits RAW image data to the server along with a development request but also applies development processing whose load is low although whose quality is relatively low in its own terminal. Then, the server applies two kinds of development processing, that is, the above-described low-load development processing and development processing whose quality is high although whose load is high, to the RAW image received from the client terminal and generates an image (in the following, described as "difference image") indicating a difference between both results and provides the difference image to the client terminal. Then, the client terminal reproduces the results of the above-described high-load development processing based on the difference image received from the server and the results of the low-load development processing obtained by its own terminal. In the following, a system configuration that implements the present embodiment is explained.

Figure 1:
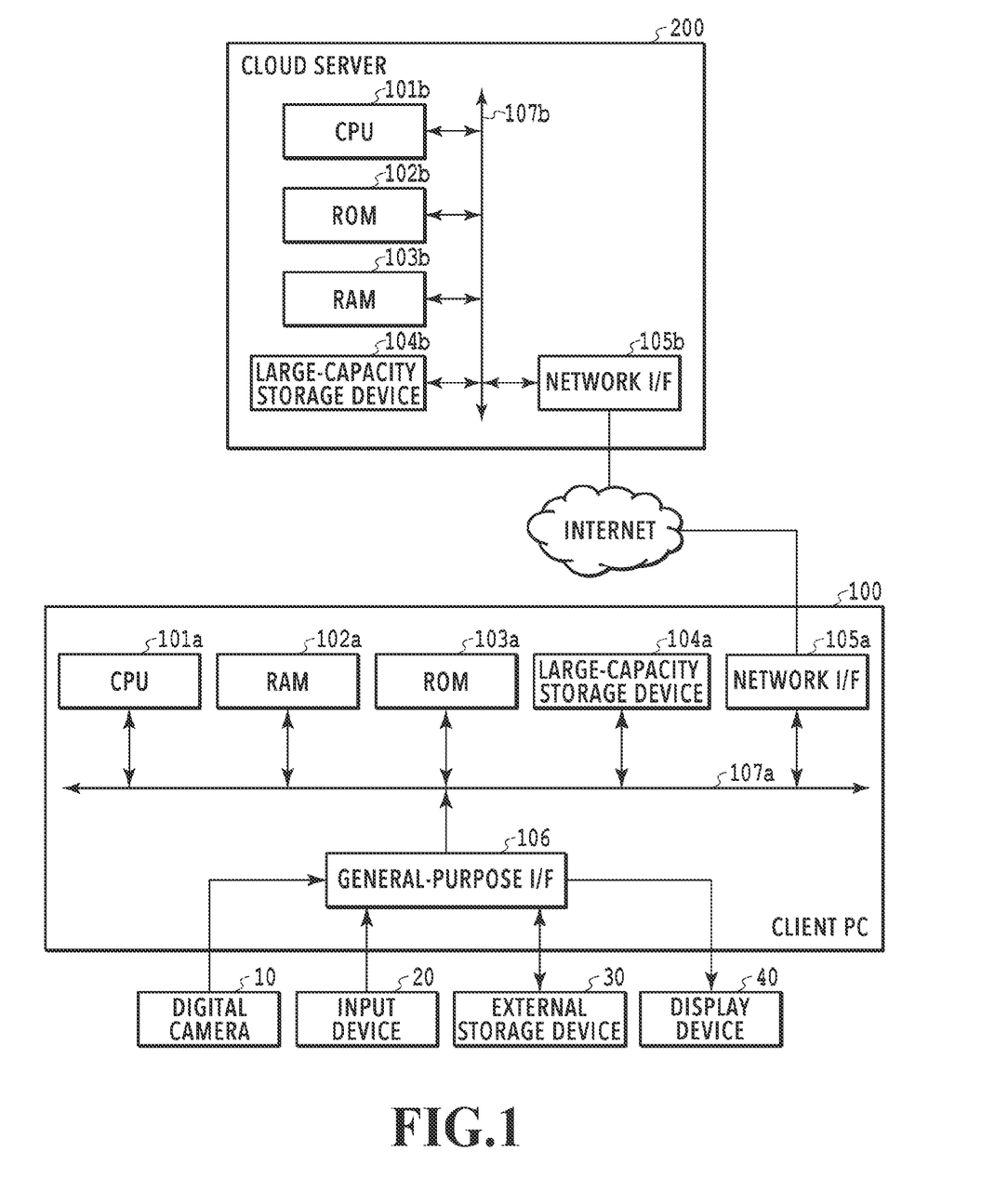
FIG. 1 is a diagram showing an example of a configuration of an image processing system.

FIG. 1 is a diagram showing an example of the configuration of an image processing system according to the present embodiment. In the image processing system shown in FIG. 1, a PC (in the following, described as "client PC") 100 as a client terminal and a cloud server 200 are connected via the internet. It is assumed that the original RAW image is obtained by performing image capturing with a digital camera 10 as an imaging device.

<Hardware Configuration of Client PC>

The client PC 100 of the present embodiment is an information processing apparatus in which a dedicated application for developing, browsing, and editing a RAW image is installed. A user transmits a RAW image (mosaic image) to the cloud server 200 and receives the development results (demosaic image) thereof and browses and edits the demosaic image by utilizing the dedicated application. The client PC 100 has a CPU 101*a*, a RAM 102*a*, a ROM 103*a*, a large-capacity storage device 104*a*, a network I/F 105*a*, and a general-purpose interface (I/F) 106 and each component is connected to one another by a system bus 107*a*. Further, the client PC 100 is also connected to the digital camera 10, an input device 20, an external storage device 30, and a display device 40 via the general-purpose I/F 106.

The CPU 101*a* centralizedly controls each component of the client PC 100 via the system bus 107*a* by executing programs stored in the ROM 103*a* using the RAM 102*a* as a work memory. Further, the large-capacity storage device 104*a* is, for example, an HDD or an SSD, and stores various kinds of data handled in the client PC 100. The CPU 101*a* writes data to the large-capacity storage device 104*a* and reads data stored in the large-capacity storage device 104*a* via the system bus 107*a*. The general-purpose I/F 106 is a serial bus interface, for example, such as USB, IEEE 1394, and HDMI (registered trademark). The client PC 100 acquires data from the external storage device 30 (various storage media, for example, such as memory card, CF card, SD card, and USB memory) via the general-purpose I/F 106. Further, the client PC 100 receives user instructions from the input device 20, such as a mouse and a keyboard, via the general-purpose I/F 106. Further, the client PC 100 outputs image data and the like processed by the CPU 101*a* to the display device 40 (various image display devices, for example, such as liquid crystal display) via the general-purpose I/F 106. Further, the client PC 100 acquires data of a captured image (RAW image) that is the target of development processing from the digital camera 10, which is an imaging device, via the general-purpose I/F 106. The network I/F 105*a* is an interface for connecting to the internet. The client PC 100 accesses the cloud server 200 by the installed web browser and performs transmission and reception of image data.

<Hardware Configuration of Cloud Server>

The cloud server 200 of the present embodiment is a server apparatus that provides a cloud service on the internet. In more detail, the cloud server 200 applies the two kinds of development processing, that is, the low-load development processing and the high-load development processing to the RAW image received from the client PC 100 and provides image data corresponding to the difference between both development processing results to the client PC 100. The cloud server 200 has a CPU 101*b*, a ROM 102*b*, a RAM 103*b*, a large-capacity storage device 104*b*, and a network I/F 105*b* and each component is connected to one another by a system bus 107*b*. The CPU 101*b* controls the entire operation by reading control programs stored in the ROM 102*b* and performing various kinds of processing. The RAM 103*b* is used as a temporary storage area, such as a main memory and a work memory of the CPU 101*b*. The large-capacity storage device 104*b* is a large-capacity secondary storage device, such as an HDD and an SSD, which stores image data and various programs. The network I/F 105*b* is an interface for connecting to the interne and receives a request from the web browser of the client PC 100 and performs transmission and reception of image data.

The components of the client PC 100 and the cloud server 200 exist other than those described above, but they are not the main purpose of the present invention, and therefore, explanation thereof is omitted. Further, in the present embodiment, it is supposed that the client PC 100 in which a dedicated application is installed makes a request for development processing of a RAW image to the cloud server 200 and receives the development results (difference image) thereof from the cloud server 200 and browses and edits the development results in the client PC 100. However, the above-described system configuration is an example and the system configuration is not limited to this. For example, the configuration may be one in which the digital camera 10 comprising the function of the client PC 100 accesses the cloud server 200 directly and transmits a RAW image and receives the development results and browses the development results in the digital camera 10.

<Flow of Processing of Entire System>

Figure 2:
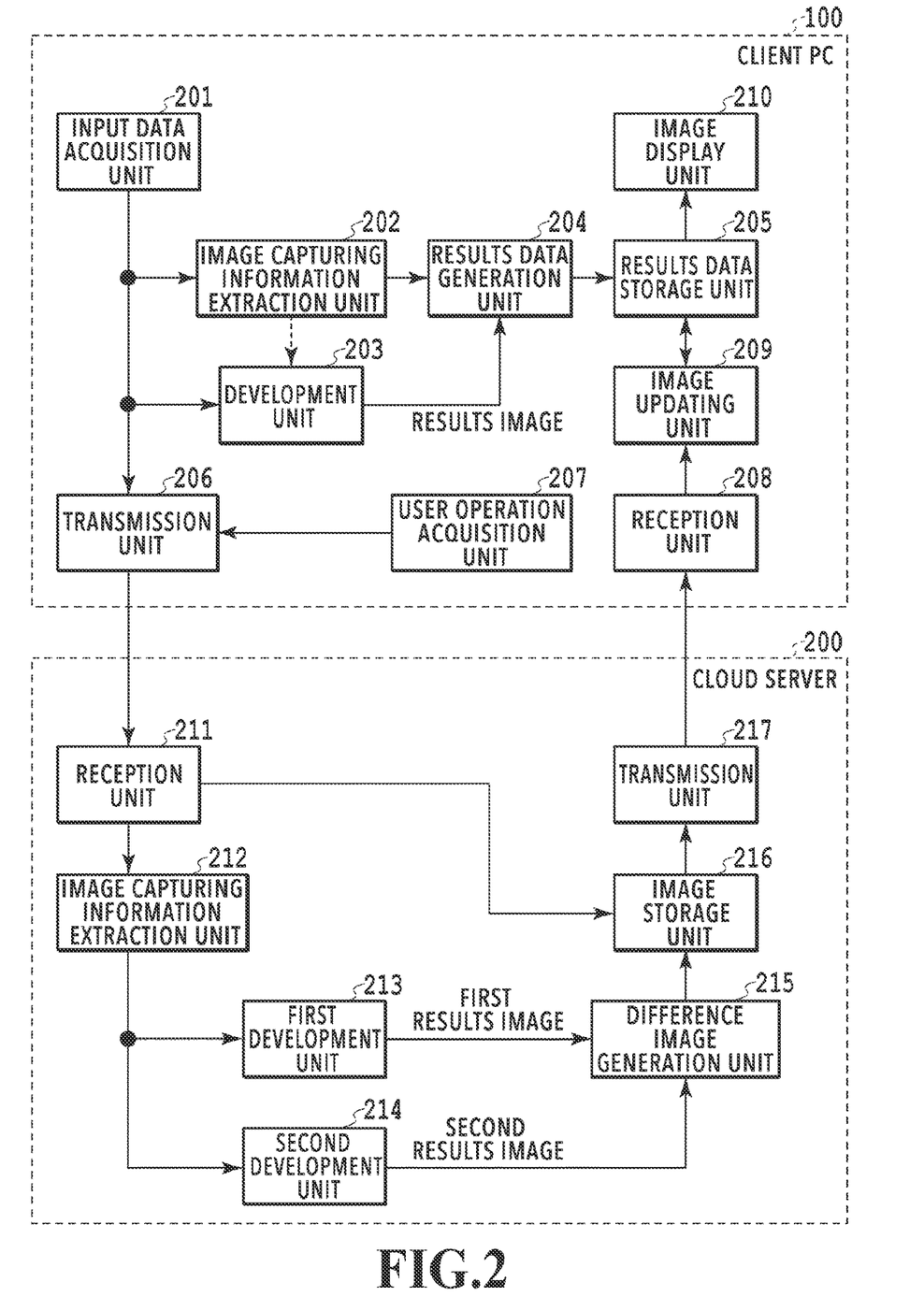
FIG. 2 is a block diagram of the entire image processing system.
Figure 3:
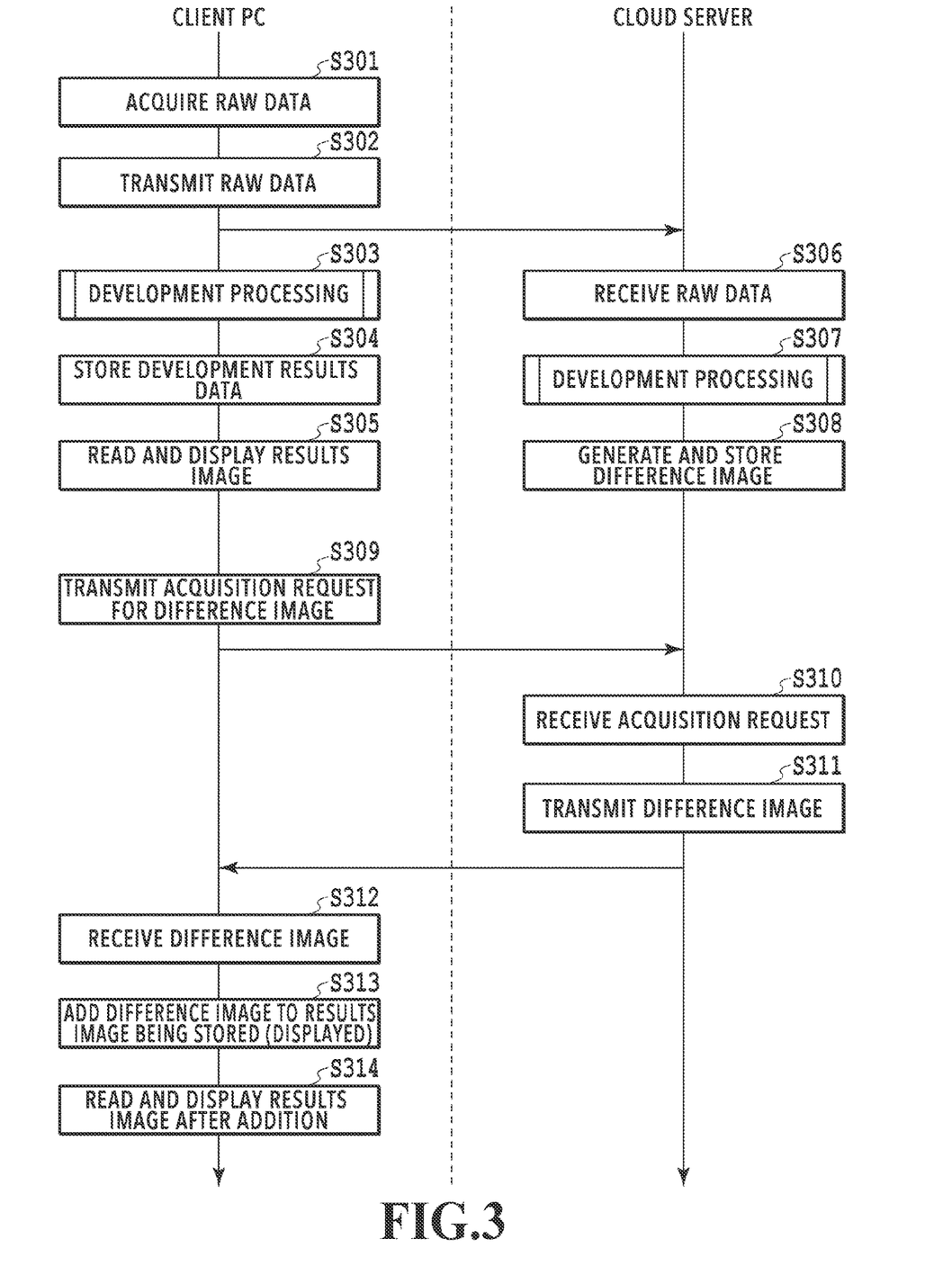
FIG. 3 is a sequence diagram showing a flow of processing in the image processing system.

Next, various kinds of processing performed in the image processing system of the present embodiment are explained. FIG. 2 is a function block diagram of the entire image processing system and FIG. 3 is a sequence diagram showing the flow of the processing in the image processing system. Each function unit shown in FIG. 2 is implemented by the CPU 101*a*/101*b* executing the computer program corresponding to each function unit. However, it may also be possible to implement all or part of the function units shown in FIG. 2 by hardware. In the following, explanation is given along the sequence diagram in FIG. 3. In the following explanation, symbol "S" means a step.

At S301, an input data acquisition unit 201 of the client PC 100 acquires data of a RAW image, which is the development processing target, from the digital camera 10. At this time, to the RAW image, information (image capturing information) relating to a variety of condition settings at the time of image capturing is attached. As the items included in the image capturing information, mention is made of the ISO sensitivity, the shutter speed, the white balance, the image capturing time, the model type of the imaging device and the like. In the following, the RAW image data to which the image capturing information is attached is called "RAW data". The acquired RAW data is output to an image capturing information extraction unit 202, a development unit 203, and a transmission unit 206. The source from which the RAW data is acquired may be not the digital camera 10 and it may also be possible to read RAW data obtained by performing image capturing in advance and stored from the external storage device 30. At S302 that follows, the transmission unit 206 transmits the RAW data received from the input data acquisition unit 201 to the cloud server 200 along with a development request therefor.

Each piece of processing at S303 to S305 that follow is performed by the client PC 100 and each piece of processing at S306 to S308 is performed by the cloud server 200 in parallel thereto.

Figure 4:
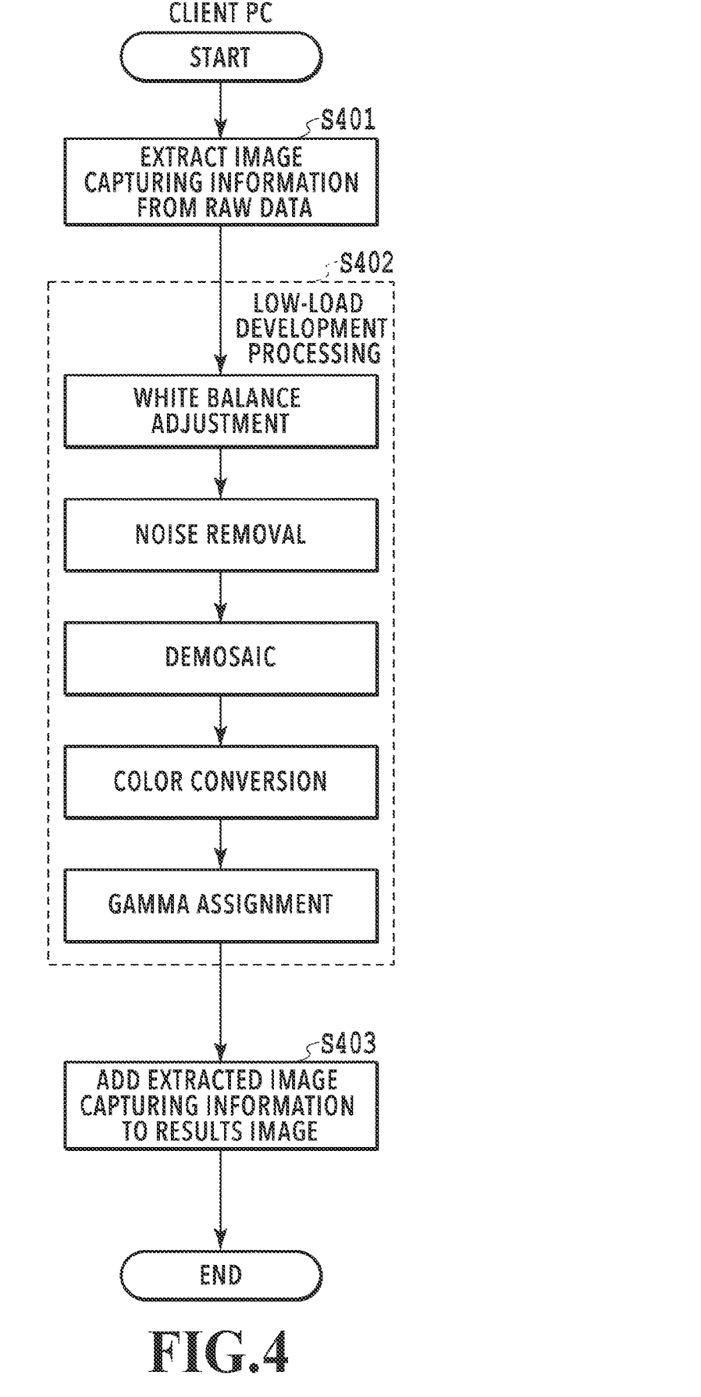
FIG. 4 is a flowchart showing a flow of low-load development processing.

At S303, the development unit 203 of the client PC 100 applies development processing to the RAW data received from the input data acquisition unit 201. The development processing in the development unit 203 is development processing whose calculation amount is comparatively small and whose processing load is low (in the following, called "low-load development processing"). Predetermined parameters (exposure, white balance and the like) used for the low-load development processing may be determined automatically based on the image capturing information extracted from the RAW data or may be set separately by a user. FIG. 4 is a flowchart showing a flow of the low-load development processing applied at this step. In the following, explanation is given along the flow in FIG. 4.

Figure 5:
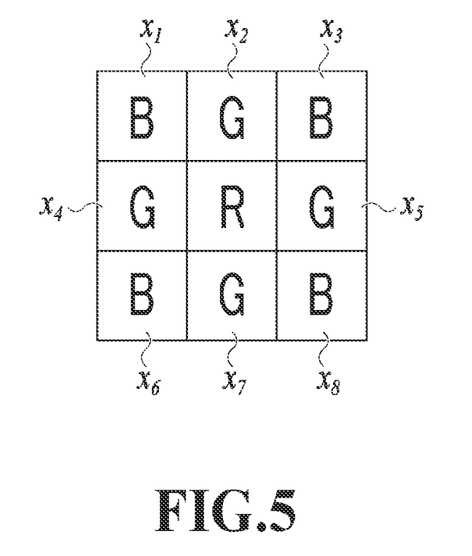
FIG. 5 is a diagram showing part of an image area in a RAW image.

First, at S401, the image capturing information extraction unit 202 extracts image capturing information from RAW data. The extracted image capturing information is output to a results data generation unit 204. At next S402, the development unit 203 applies the low-load development processing. The low-load development processing of the present embodiment includes five pieces of processing: white balance adjustment, noise removal (reduction), demosaic, color conversion, and gamma assignment. Then, in each piece of the processing, processing whose load is less or equal compared to that of each piece of processing in the development processing whose calculation cost is high, which is performed in the cloud server 200, to be described later, is performed. The processing configuring the development processing is not limited to the above-described five pieces of processing. Here, demosaic is explained. The demosaic processing is processing to convert, in a case where the data format of the captured image included in the RAW data is the data format in conformity to the sensor output, the data format into a data format in which each pixel has components of RGB. The data format in conformity to the sensor output is, for example, the data format in which each pixel has one of RGB components in accordance with the Bayer array. In the demosaic in the low-load development processing, for the pixel of interest, information on the two remaining color components that do not exist in the pixel is estimated by, for example, bilinear interpolation. The bilinear interpolation is a method of finding the value of a certain defective pixel as the average of the values of eight surrounding non-defective pixels in the vicinity of the defective pixel. FIG. 5 is a diagram showing part of the image area in the RAW image. For example, in the image area of 3×3 pixels as shown in FIG. 5, the value of the G component in the center pixel storing only the R component can be found as the average value of the G components of four surrounding pixels ($x_2$, $x_4$, $x_5$, $x_7$) as indicated by formula (1) below.
[Mathematical Formula 1]

$$\text{(value of G of R pixel at the center)} = (x_2 + x_4 + x_5 + x_7)/4 \quad \text{formula (1)}$$

Similarly, the B component can also be found as the average value of the B components of four surrounding pixels ($x_1$, $x_3$, $x_6$, $x_8$) of the center pixel as indicated by formula (2) below.
[Mathematical Formula 2]

$$\text{(value of B of R pixel at the center)} = (x_1 + x_3 + x_6 + x_8)/4 \quad \text{formula (2)}$$

For the mosaic in the low-load development processing, it may also be possible to use another interpolation method, such as bicubic interpolation and nearest neighbor. Further, such processing may be accepted in which edge components are extracted by image analysis and interpolation is switched between bilinear interpolation and bicubic interpolation in accordance with whether or not the area is a flat area or in accordance with the edge direction. The data of the image (results image) in which each pixel has RGB components, which is the results of the low-load development processing, is output to the results data generation unit 204.

At S403, the results data generation unit 204 generates development results data by attaching the image capturing information extracted by the image capturing information extraction unit 202 to the results image output from the development unit 203. At this time, it may also be possible to attach the image capturing information after compressing the above-described results image by the jpeg format. The compression method is not limited to the jpeg format and compression may be performed by, for example, the YUV format. Further, it may also be possible to perform the compression by the YUV format further for the image compressed by the jpeg format. The development results data thus generated is output to a results data storage unit 205. The above is the contents of the development processing at S303. Explanation is returned to the flow in FIG. 3.

At S304, the results data storage unit 205 stores the development results data received from the results data generation unit 204 in the RAM 102a or the large-capacity storage device 104a. Then, at S305, the image display unit 210, which is the display control unit of the display device 40, accesses the results data storage unit 205 and reads the stored development results data and displays the results image within the development results data on the display device 40 as a preview image.

Figure 6:
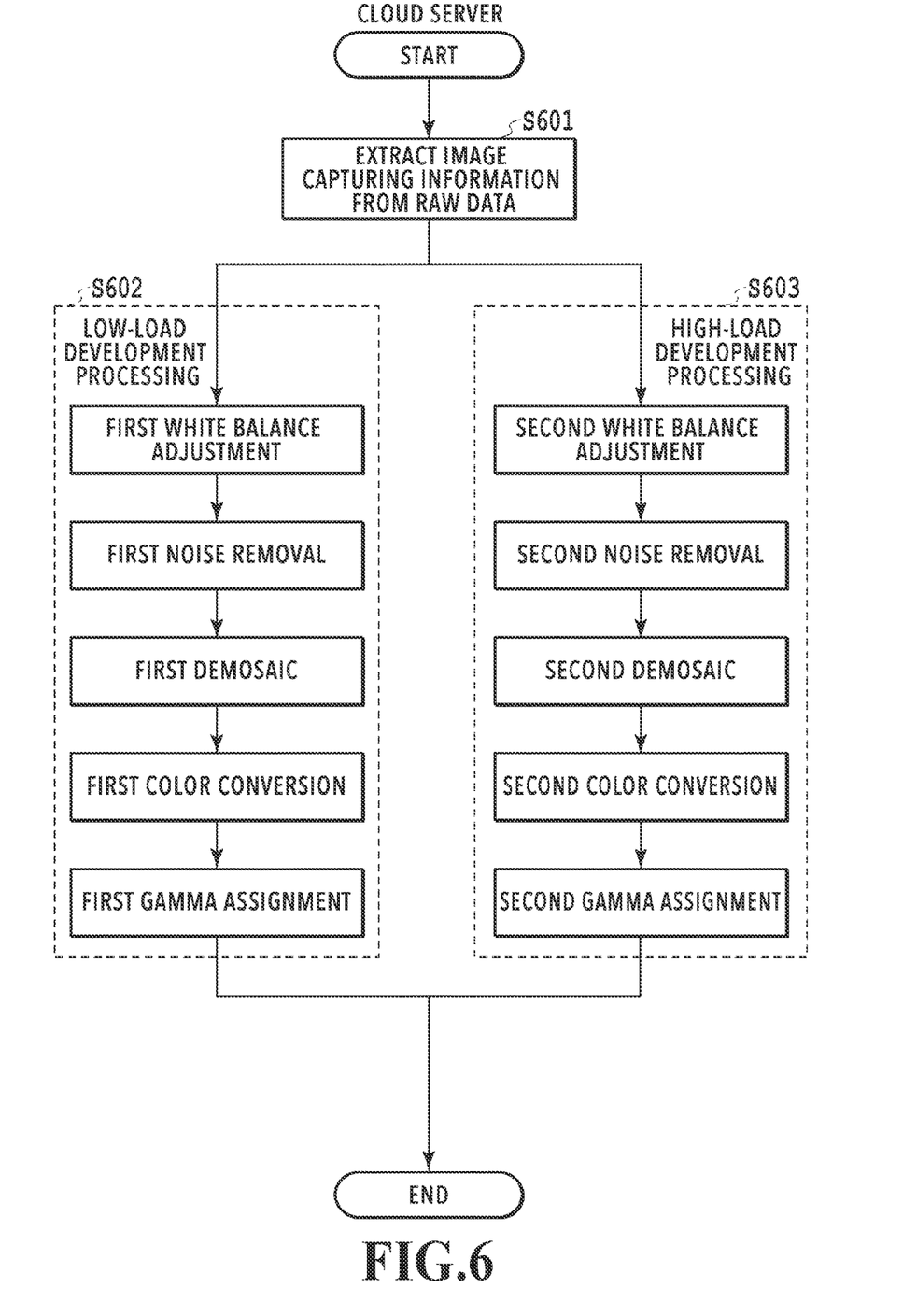
FIG. 6 is a flowchart showing a flow of development processing applied in a cloud server.

Following the above, the processing on the side of the cloud server 200 at S306 and subsequent steps is explained. First, at S306, a reception unit 211 of the cloud server 200 receives the RAW data transmitted from the client PC 100. At next S307, in two development units (first development unit 213 and second development unit 214) within the cloud server 200, development processing whose contents are different is applied respectively to the RAW data. FIG. 6 is a flowchart showing the flow of the development processing applied at this step. In the following, explanation is given along the flow in FIG. 6.

First, at S601, as at S401 described previously, an image capturing information extraction unit 212 of the cloud server 200 extracts image capturing information from the received RAW data. The extracted image capturing information is output to the first development unit 213 and the second development unit 214.

Next, at S602, the first development unit 213 applies the low-load development processing and at S603, the second development unit 214 applies the high-load development processing, respectively, to the RAW data received at S306.

First, the low-load development processing (S602) applied by the first development unit 213 is explained. The low-load development processing applied by the first development unit 213 is the same as the low-load development processing explained at S303 described above. That is, the first development unit 213 applies the same development processing applied by the development unit 203 of the client PC 100. Here, in "the same development processing", at least the processing contents need to be the same, but the processing results thereof do not necessarily need to be the same. For example, in a case where the development unit 203 of the client PC 100 performs the demosaic processing by the bilinear interpolation, it is necessary to perform the demosaic processing in the first development unit 213 by the bilinear interpolation. However, the results thereof do not need to be completely the same and for example, the occurrence of a difference in the range of a rounding error of the interpolation results for part of pixels is allowed. It is assumed that the cloud server 200 prepares in advance the same program as the low-load development processing program installed in the client PC 100. The results image (in the following, called "first results image") of the low-load development processing in the first development unit 213 are output to a difference image generation unit 215.

Next, the high-load development processing (S603) applied by the second development unit 214 is explained. The high-load development processing applied by the second development unit 214 is development processing whose processing load is higher than that of the development processing applied by the first development unit 213 and by which the development results of a higher quality can be obtained. The high-load development processing of the present embodiment includes, as in the case of the low-load development processing described previously, five pieces of processing: white balance adjustment, noise removal (reduction), demosaic, color conversion, and gamma assignment. Then, in each piece of the processing, processing whose processing load is equal or higher compared to that of each piece of processing configuring the low-load development processing described previously is applied. The processing configuring the development processing is not limited to the above-described five pieces of processing. Here, the demosaic whose calculation cost is high in the high-load development processing is explained. In the present embodiment, as the high-load demosaic processing in the high-load development processing, demosaic processing using a neural network trained in advance is performed. As the demosaic using a neural network, for example, there is a method of learning a demosaic network based on a convolutional neural network (see Syu, Nai-Sheng, Yu-Sheng Chen, and Yung-Yu Chuang. "Learning deep convolutional networks for demosaicing." arXiv preprint arXiv: 1802. 03769 (2018)). In addition thereto, it may also be possible to perform, as the high-calculation-cost demosaic processing, a method of referring to, for example, information on the area whose color within an image is similar, or a method of referring to information on the pixel or the area at the corresponding position in the past frame in a case where a moving image is taken as a processing target. Further, it may also be possible to determine the parameters used for the development processing based on the image capturing information extracted at S601. The image in the RGB format obtained by the high-load development processing including the high-calculation-cost demosaic such as this has the same image format (that is, the image size and the like are the same) as that of the first results image described above. In the present embodiment, it is assumed that the processing whose contents are the same as those of the low-load development processing (S402) is applied to the four remaining pieces of processing (white balance adjustment, noise removal (reduction), color conversion, gamma assignment) other than the demosaic. In this manner, the results image (in the following, called "second results image") of the high-load development processing in the second development unit 214 is output to the difference image generation unit 215. The above is the contents of the development processing at S307. Explanation is returned to the flow in FIG. 3.

Figure 7A:
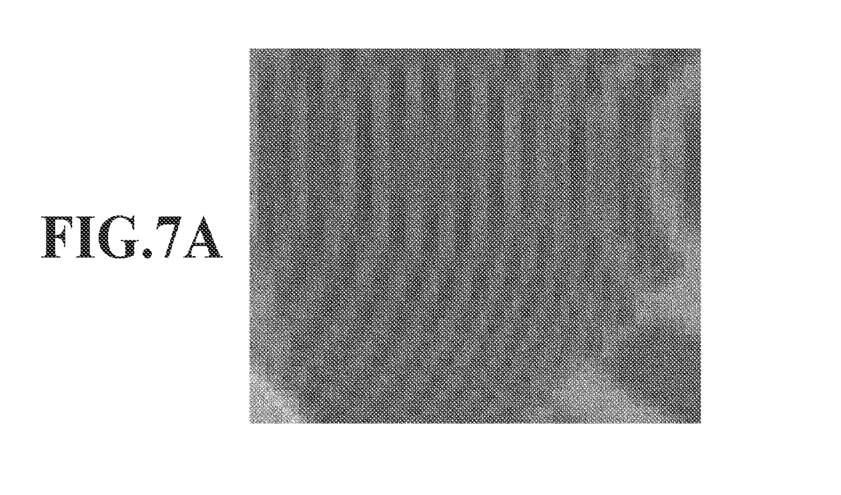
FIG. 7A is an enlarged diagram of part of a first results image and FIG. 7B is an enlarged diagram of the corresponding part in a second results image.
Figure 7B:
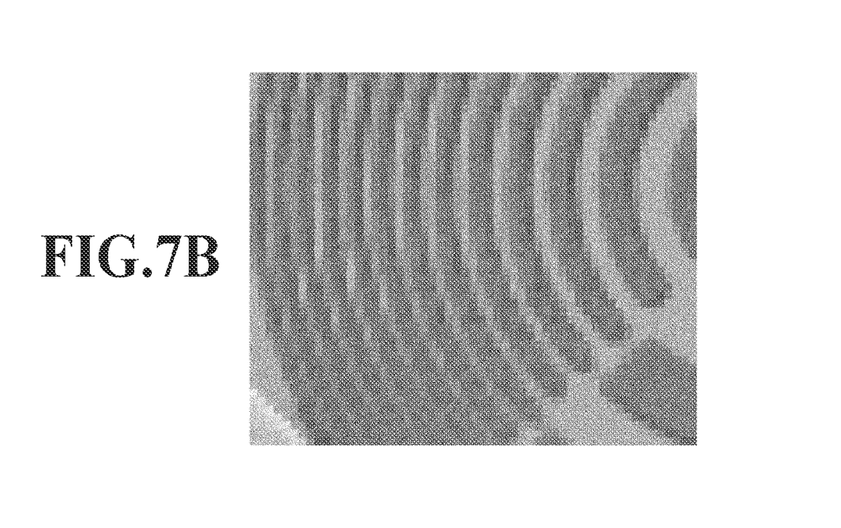

In a case where the development processing is completed in the first development unit 213 and the second development unit 214 respectively, at S308, the difference image generation unit 215 generates an image (difference image) indicating the different by extracting the difference between the first results image and the second results image, which are received. FIG. 7A is an enlarged diagram of part of the first results image and FIG. 7B is an enlarged diagram of the corresponding part in the second results image. It is known that the second results image is an image of a higher quality. As described above, there is a difference in the fine part between the first results image and the second results image and the difference image is generated by extracting the difference in units of pixel. The data of the obtained difference image is stored in the RAM 103b or the like by an image storage unit 216. Prior to the storage, it may also be possible to further perform compression for the generated difference image as explained in the development processing (S303) in the client PC 100. As the compression method at this time, the same method as that of the compression format that is applied at S403 described previously is applied. The first results image and the second results image usually have substantially the same structure and are different only in the fine part, and therefore, by performing compression for the difference image, it is possible to expect a further reduction in the amount of data compared to the data amount reduction effect in a case where both results images are compressed as separate images. The reason the data of the difference image is stored temporarily is to enable transmission of the data of the difference image to the client PC 100 at preferable timing. Here, the preferable timing is, for example, timing at which the communication situation between the client PC 100 and the cloud server 200 is good and timing at which a user requires the difference image (timing at which an acquisition request, to be described later, is received). It may also be possible to design a configuration so that the data of the generated difference image is transmitted immediately to the client PC 100 without performing storage processing. In this case, the data storage unit 216 is no longer necessary.

At S309, a user operation acquisition unit 207 of the client PC 100 receives instructions to download the difference image. A user specifies the difference image the user desires to download and gives the instructions by using the input device 20. The user operation acquisition unit 207 transmits an acquisition request for the difference image according to the user instructions to the cloud server 200 via the transmission unit 206. It may also be possible to transmit the acquisition request automatically. For example, the communication state with the cloud server 200 is monitored and in a case where the state becomes good, the acquisition request for those whose development results are not received yet is transmitted, or in a case where a user performs the operation to enlarge the preview image described above on the operation screen, the acquisition request for the image is transmitted, and so on.

At S310, the reception unit 211 of the cloud server 200 receives the acquisition request for the difference image. Then, at S311, a transmission unit 217 of the cloud server 200 reads the data of the difference image designated by the acquisition request and transmits the data to the client PC 100.

At S312, a reception unit 208 of the client PC 100 receives the data of the difference image sent from the cloud server 200. The received data of the difference image is output to an image updating unit 209. Then, at S313, the image updating unit 209 updates the results image stored in the results data storage unit 205 based on the received difference image. In more detail, first, the stored development results data is read form the large-capacity storage device 104a or the like via the results data storage unit 205. Then, to the results image within the read development results data, the difference image received from the cloud server 200 is added. At this time, in a case where the storage results image and the received difference image are compressed, the addition is performed after decompressing both images. Due to this, the second results image by the high-load development processing in the second development unit 214 is reproduced (restored) in the client PC 100. Then, the results image after the difference image is added is stored within the development results data as a new results image. That is, the results image by the low-load development processing is overwritten by the results image by the high-load development processing. Further, it may also be possible for the image updating unit 209 to store the received difference image in association with the results image stored in the results data storage unit 205.

At S314, the image display unit 210 accesses the results data storage unit 205 and reads the stored development results data and displays the updated results image on the display device 40 in place of the preview image currently being displayed. That is, in this stage, the display switches from the development results whose quality is relatively low to the development results of a higher quality.

The above is the flow of the processing in the image processing system according to the present embodiment. In the present embodiment, the example is shown in which only the contents of the demosaic processing are different between the low-load development processing and the high-load development processing, but it may also be possible to make the processing contents different in a plurality of pieces of processing configuring the development processing, such as noise reduction processing and color conversion processing.

MODIFICATION EXAMPLE 1

Next, processing in a case where the development processing-target RAW image is a moving image is explained as modification example 1. The basic configuration of the system and the flow of the processing are same, and therefore, different points are explained mainly along the sequence diagram in FIG. 3 described previously.

First, a RAW image in the moving image format (in the following, called "RAW moving image") in which a plurality of frames is arranged in a time series and RAW data including its image capturing information are acquired (S301). Following the above, the acquired RAW data is transmitted to the cloud server 200 along with its development request (S302). Then, the development processing described previously is applied in the client PC 100 and the cloud server 200, respectively.

In the client PC 100, the low-load development processing is applied to the RAW data (S303). At this time, the low-load development processing is applied to each frame configuring the RAW moving image. Then, to the results image in units of developed frame, the image capturing information is attached and the results image is stored as the development results data (S304) and the results image is displayed on the display device 40 as a preview moving image (S305).

On the other hand, in the cloud server 200, the low-load development processing and the high-load development processing are applied in parallel to the RAW data received from the client PC 100 (S306, S307). At this time also, both pieces of development processing are applied in units of frame configuring the RAW moving image. Then, based on the results of both pieces of development processing, the difference image generation unit 215 generates the difference image in units of frame (S308). At this time, in the present modification example, each frame included in the second results image that is input from the second development unit 214 is compressed in a time series into moving image data of, for example, the MOV format. For the compression in a time series, it may also be possible to use another format, such as the MPEG format and the AVI format. Then, at the time of compression, replacement with the difference image is performed for only the key frame. Due to this, it is possible to reduce the amount of data of the key frame and also reduce the amount of data of the entire results of the compression in a time series.

Following the above, in a case of receiving the acquisition request for the difference image from the client PC 100 (S309, S310), the cloud server 200 transmits the moving image data that includes the difference image and which is compressed in a time series to the client PC 100 (S311). In the client PC 100 having received the above-described moving image data from the cloud server 200, the updating processing of the results image is performed in the image updating unit 209 (S312, S313). In the present modification example, the moving image data including the difference image of the key frame is compressed in a time series as described above, and therefore, the moving image data that is decompressed in a time series is input to the image updating unit 209. Then, the image updating unit 209 reads the development results data from the results data storage unit 205 and adds the difference image only to the key frame among the frame group thereof. The remaining frames are replaced with corresponding frames in the moving image data compressed in a time series. Then, the group of the replaced frames is converted into the moving image of the MOV format and the converted moving image is stored within the development results data as a new results image. Then, the updated development results data is read by the image display unit 210 and a new results image by the moving image is displayed on the display device 40.

The above is the flow of the processing in the image processing system according to the present modification example. In the present modification example, the example is shown in which only the key frame is replaced with the difference image and stored, but it may also be possible to design a configuration in which the frame other than the key frame is also replaced with the difference image and stored. For example, it may also be possible to generate a moving image (difference moving image) in which all the frames are replaced with the difference images. In this case, it is possible for the image updating unit 209 to obtain a high-quality development image by comparing each frame in the results image before updating and each frame in the difference moving image and calculating the sum of both for each frame. Further, in the present modification example, the example is shown in which transmission and reception of data between each block are performed in units of processing-target moving image, but it may also be possible to reduce the unit in which data is transmitted and received. For example, it may also be possible to perform the transmission and reception of data and the image processing sequentially by dividing the moving image into small moving images, or separating the moving image in units of one frame, and so on.

MODIFICATION EXAMPLE 2

Next, an aspect is described as modification example 2 in which the amount of data is reduced by dividing a difference image into a plurality of areas and storing and performing transmission and reception of only the partial image corresponding to the area whose difference is large. As in the modification example 1, the basic configuration of the system and the flow of the processing are the same, and therefore, different points are explained mainly along the sequence diagram in FIG. 3 described previously.

Figure 8:
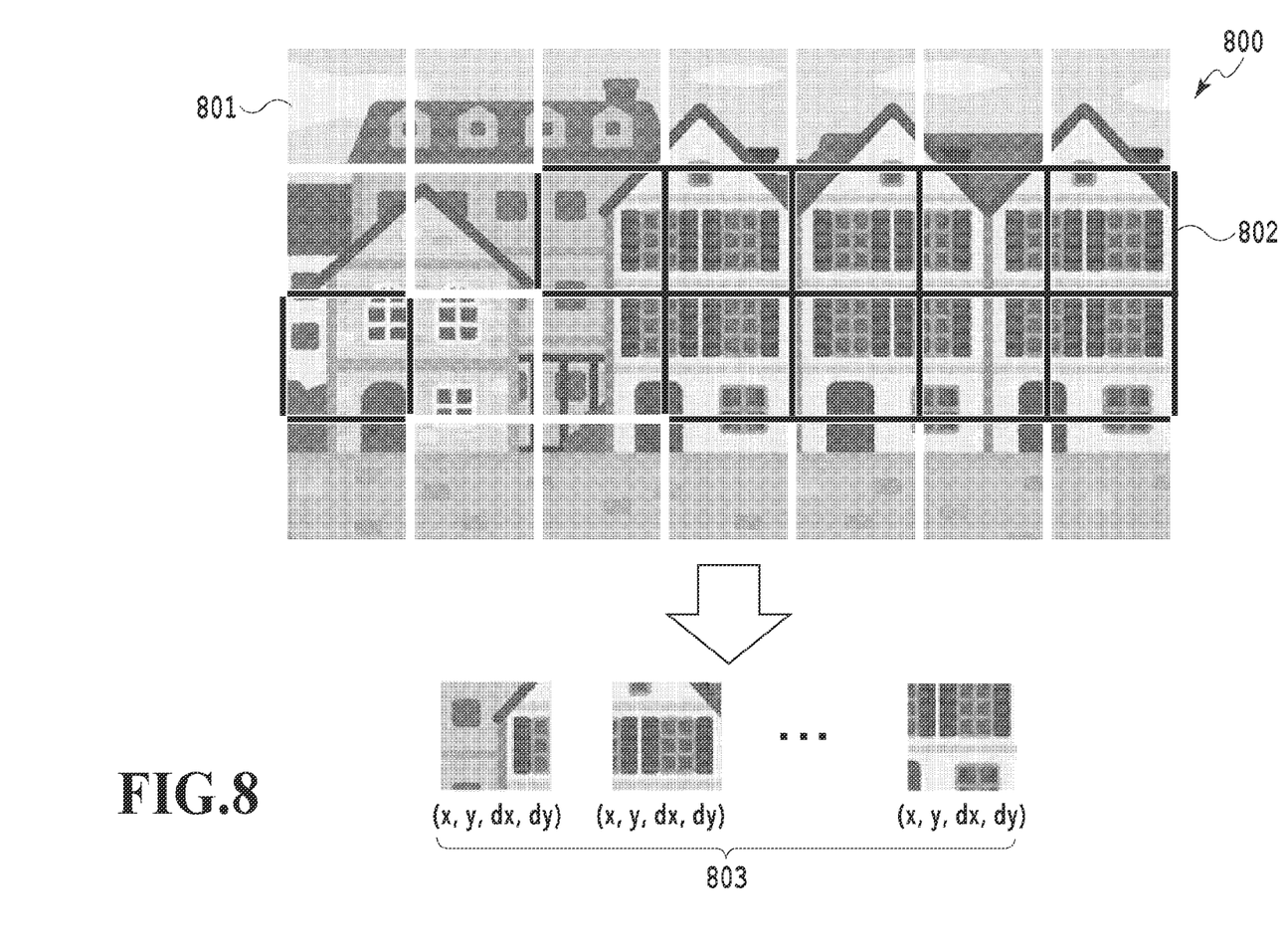
FIG. 8 is a diagram explaining the way an image is divided into a plurality of grid-shaped areas.
Figure 9A:
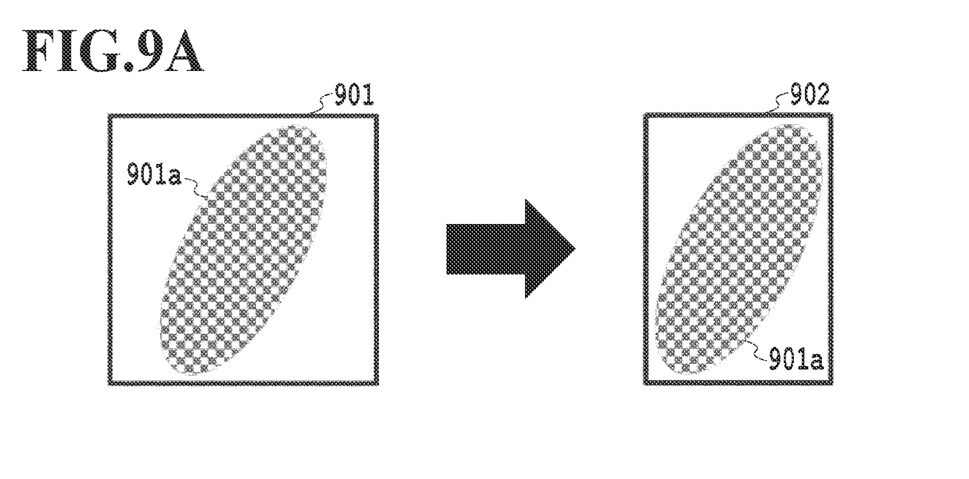
FIG. 9A to FIG. 9C are diagrams explaining size adjustment processing of a rectangular area.
Figure 9B:
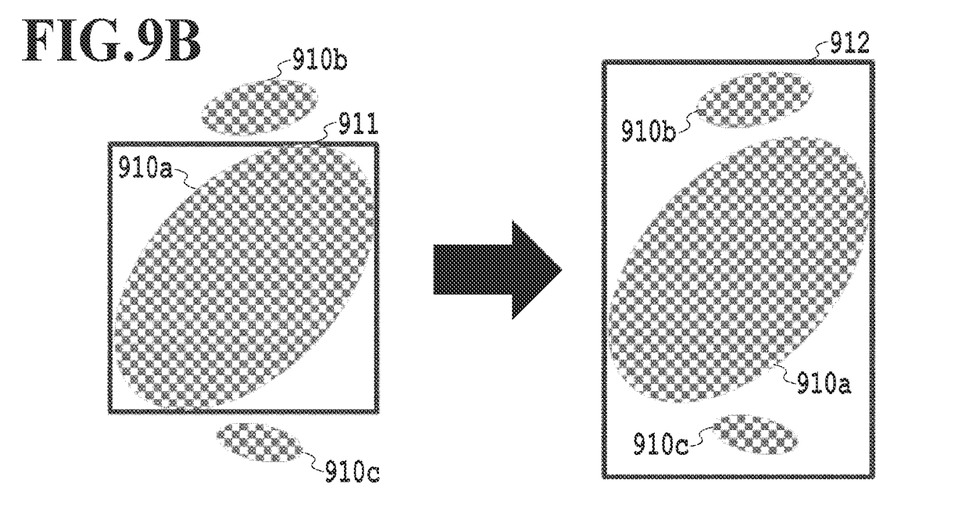
Figure 9C:
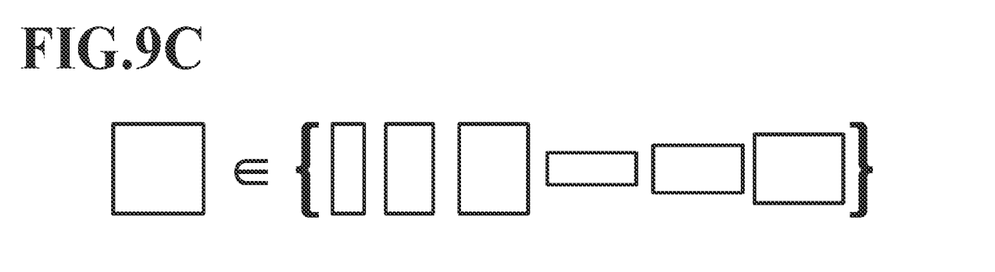

There is no difference in particular in each piece of the processing at S301 to S307, and therefore, explanation is omitted. After the two kinds of development processing area completed, the difference image generation unit 215 of the present modification example generates a difference image indicating a difference between the first results image and the second results image and extracts only a partial image of the area whose difference is large after further dividing the difference image into grid-shaped areas (S308). FIG. 8 is a diagram explaining the way the image is divided into a plurality of grid-shaped areas. In FIG. 8, for convenience of explanation, the second results image is used in place of the difference image and grids are displayed on an image 800 in an overlapping manner. The difference image generation unit 215 evaluates the magnitude of the difference for each divided rectangular area 801 and extracts a rectangular area group 803 including areas (rectangular areas indicated by black frames in FIG. 8) 802 having the difference larger than or equal to a threshold value. It may be possible to evaluate the magnitude of the difference by taking, as an index, the mean absolute error, the mean squared error, the maximum value of the absolute value of the error, the mode of the absolute value of the error and the like of the pixels in the first results image and the second results image. Then, in the present modification example, size adjustment processing is further performed for each rectangular area of the extracted rectangular area group 803. FIG. 9A to FIG. 9C are diagrams explaining the size adjustment processing of the rectangular area. FIG. 9A is an explanatory diagram in a case where the size is reduced. In FIG. 9A, a rectangular area 901 includes a pixel group 901a whose magnitude of the difference is determined to be larger than or equal to a threshold value. The processing to reduce the rectangular area size is performed for the rectangular area 901a so that a smaller area, such as a rectangular area 902, can include the pixel group 901a. On the other hand, FIG. 9B is an explanatory diagram in a case where the size is increased. In FIG. 9B, a rectangular area 911 includes, among three pixel groups 910 to 910c whose magnitude of the difference is determined to be larger than or equal to the threshold value, only the pixel group 910a. As with the rectangular area 911, in a case where the pixel groups whose magnitude of the difference is determined to be larger than or equal to the threshold value exist around itself, the size is increased so as to include those pixel groups. In order to implement this, as shown in FIG. 9C, rectangular area candidates having a plurality of sizes and aspect ratios are tested in order and a rectangular area capable of including the peripheral image groups with a smaller area is selected. As a result of that, as shown in FIG. 9B, the size is changed to a rectangular area 912 with the smallest area. The determination method of the rectangular area size may be not the method of selecting from among candidates and it may also be possible to determine the size by a method of increasing/reducing the size by a search. To the partial image corresponding to the rectangular area for which the size adjustment has been performed in this manner, information (area information) indicating the position and size of the area, here, information on the coordinates of the upward left of the rectangular area and the number of pixels in the vertical direction and the number of pixels in the horizontal direction (x, y, dx, dy) is attached. The description method of the area information is not limited to this format. For example, position coordinates ($x_{\_UL}$, $y_{\_UL}$, $y_{\_DR}$) indicating two points, that is, the upward left point and the downward right point of each rectangular area may be accepted. Alternatively, it may also be possible to specify the information by the format of a mask image corresponding to a plurality of rectangular areas. Further, in a case where the size and arrangement of the rectangular areas are uniform, it may also be possible to give an ID indicating the position to each rectangular area and utilize the ID as area information. The data of the partial image to which the area information is attached as described above is stored by the data storage unit 216.

Following the above, in a case of receiving the acquisition request for the difference image from the client PC 100 (S309, S310), the cloud server 200 transmits the data of the above-described partial image to the client PC 100 (S311). In the client PC 100 having received the data of the above-described partial image from the cloud server 200, updating processing of the results image is performed in the image updating unit 209 (S312, S313). In the present modification example, by referring to the area information attached to the received partial image, the pixel value of each partial image is added to the corresponding position in the development results before updating. The updated results image to which the partial image is added in this manner is stored within the development results data as a new results image. Then, the updated development results data is read by the image display unit 210 and a new results image is displayed on the display device 40.

The above is the flow of the processing in the image processing system according to the present modification example. According to the present embodiment, it is possible to further reduce the capacity of the data that is transmitted and received between the cloud server and the client PC. In the present modification example, the example is shown in which the difference image is divided into grid-shaped areas, but the division method is not limited only to this. For example, it may also be possible to perform division using a shape other than the rectangle or perform area division by segmentation. Further, in the present modification example, the example is shown in which the difference image is divided in the direction of space, but it may also be possible to perform division in the direction of the color component. For example, it may also be possible to, after dividing the difference image into a plurality of rectangular areas, further divide each rectangular area into three color components (r, g, b) in accordance with the RGB color space or into three color components (L, a, b) in accordance with the L*a*b* color space. The division at this time is performed after converting the difference image into a predetermined color space. Then, it is sufficient to output only the color component whose difference is large.

MODIFICATION EXAMPLE 3

Further, it may also be possible to cause each pixel of the difference image to have only information on the color components that the pixel itself does not have originally. For example, in FIG. 5 described previously, the R pixel at the center of the image is caused to store only the information on the G component and the B component. In this case, the image updating unit 209 adds the pixel value of the color component that does not exist in the input RAW image to each pixel based on the received difference image. Due to this, it is possible to further reduce the amount of data that is stored and transmitted by the cloud server 200.

As above, according to the present embodiment, in the image processing system in which development processing is applied to the RAW image in the server and results thereof are provided to the client terminal, it is possible to reduce the image data that is stored on the server and the capacity of the image data that is transmitted from the server to the client.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, in an image processing system in which development processing is applied to a RAW image in a server and results thereof are provided to a client terminal, it is possible to reduce the capacity of image data that is transmitted to the client terminal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-106853, filed Jun. 22, 2020 which is hereby incorporated by reference wherein in its entirety.

What is claimed is:

1. An image processing apparatus comprising:
a development unit configured to apply development processing to an input RAW image;
an acquisition unit configured to acquire a difference image indicating a difference between a first results image obtained by applying first development processing the same as the development processing to the RAW image and a second results image obtained by applying second development processing different from the first development processing to the RAW image,
wherein the development processing includes at least demosaic processing, demosaic processing in the first development processing is processing to estimate information on a color component that does not exist in a pixel of interest by an interpolation method, and demosaic processing in the second development processing is processing that uses a trained neural network; and
a generation unit configured to generate a third results image by applying development processing to the RAW image based on the first results image and the difference image, wherein the development processing includes at least demosaic processing,
demosaic processing in the first development processing is processing to estimate information on a color component that does not exist in a pixel of interest by an interpolation method,
demosaic processing in the second development processing is processing that uses a trained neural network, and
a processing load of the second development processing is higher than that of the first development processing.

2. The image processing apparatus according to claim 1, further comprising:
a display control unit configured to control a display unit configured to display a results image developed by the development unit, wherein
the display control unit can switch a results image displayed on the display unit to the third results image.

3. The image processing apparatus according to claim 1, wherein
the difference image that is acquired by the acquisition unit is compressed and
the generation unit performs the generation by decompressing the compressed difference image.

4. The image processing apparatus according to claim 3, wherein
the compression format is at least one of a jpeg format and a YUV format.

5. The image processing apparatus according to claim 1, further comprising:
a transmission unit configured to transmit a development request along with the RAW image to another apparatus that performs the first development processing and the second development processing, wherein
the acquisition unit acquires the difference image by receiving the difference image from the other apparatus.

6. The image processing apparatus according to claim 5, wherein
the transmission unit transmits an acquisition request for the difference image to the other apparatus in accordance with user instructions and
the acquisition unit acquires the difference image by receiving the difference image that the other apparatus transmits in response to the acquisition request.

7. The image processing apparatus according to claim 1, wherein
the acquisition unit acquires, along with area information thereon, a partial image whose magnitude of the difference is larger than or equal to a predetermined threshold value among a plurality of partial images obtained by dividing the difference image into a plurality of areas and
the generation unit performs the generation by taking a corresponding area in a results image developed by the development unit as a target based the partial image and the area information thereon, which are acquired.

8. The image processing apparatus according to claim 7, wherein
the magnitude of the difference is determined by taking, as an index, one of a mean absolute error, a mean squared error, a maximum value of an absolute value of an error, and a mode of an absolute value of an error of pixels in the first results image and the second results image.

9. The image processing apparatus according to claim 8, wherein
the partial image is a rectangle and whose size is adjusted so that more pixels whose magnitude of the difference is larger than or equal to a predetermined threshold value are included with a less area.

10. The image processing apparatus according to claim 7, wherein
the partial image is an image representing a color component whose difference in a case where an area thereof is further divided in a color component direction in accordance with a predetermined color space is larger than or equal to a predetermined threshold value.

11. The image processing apparatus according to claim 1, wherein
each pixel of the difference image has only information on a color component that does not exist in its own pixel in the RAW image.

12. The image processing apparatus according to claim 1, wherein
the RAW image is a moving image consisting of a plurality of frames,
the development unit applies the development processing in units of frame,
the acquisition unit acquires the difference image in units of frame indicating a difference between a first results image in units of frame indicating results obtained by applying, in units of frame, first development processing the same as development processing by the development unit and a second results image in units of frame indicating results obtained by applying, in units of frame, second development processing different from development processing by the development unit, and
the generation unit updates an image in units of frame developed by the development unit based on the difference image in units of frame.

13. The image processing apparatus according to claim 12, wherein
the acquisition unit acquires a difference image corresponding to a key frame in a plurality of frames configuring the moving image as the difference image in units of frame.

14. The image processing apparatus according to claim 13, wherein
a difference image corresponding to the key frame is compressed in a time series and
the generation unit generates an image in units of frame developed by the development unit by decompressing the difference image that is compressed in the time series and which corresponds to the key frame.

15. An image processing apparatus comprising:
a development unit configured to apply development processing to an input RAW image;
a storage unit configured to store a results image indicating results of the development processing;
an acquisition unit configured to acquire a difference image indicating a difference between a first results image obtained by applying first development processing the same as the development processing to the RAW image and a second results image obtained by applying second development processing different from the development processing to the RAW image,
wherein the development processing includes at least demosaic processing, demosaic processing in the first development processing is processing to estimate information on a color component that does not exist in a pixel of interest by an interpolation method, and demosaic processing in the second development processing is processing that uses a trained neural network; and
an updating unit configured to store the stored results image in association with the acquired difference image or update the stored results image by the acquired difference image.

16. An image processing apparatus comprising:
a development unit configured to apply first development processing and second development processing different from the first development processing to an input RAW image; and
a generation unit configured to generate a difference image indicating a difference between a first results image obtained by applying the first development processing and a second results image obtained by applying the second development processing,
wherein the development processing includes at least demosaic processing, demosaic processing in the first development processing is processing to estimate information on a color component that does not exist in a pixel of interest by an interpolation method, and demosaic processing in the second development processing is processing that uses a trained neural network.

17. The image processing apparatus according to claim 16, further comprising:
a storage unit configured to store the difference image, wherein
the generation unit reads and transmits the difference image stored in the storage unit to another apparatus in response to a request from the other apparatus.

18. An image processing system that develops a RAW image, comprising:
a first apparatus and a second apparatus, wherein
the first apparatus comprises:
a development unit configured to apply development processing to an input RAW image;
a storage unit configured to store a results image indicating results of the development processing;
an acquisition unit configured to acquire a difference image indicating a difference between a first results image obtained by applying first development processing the same as the development processing to the RAW image and a second results image obtained by applying second development processing different from the development processing to the RAW image,
wherein the development processing includes at least demosaic processing, demosaic processing in the first development processing is processing to estimate information on a color component that does not exist in a pixel of interest by an interpolation method, and demosaic processing in the second development processing is processing that uses a trained neural network; and
an updating unit configured to update the results image stored in the storage unit based on the difference image, and
the second apparatus comprises:
an acquisition unit configured to acquire a RAW image from the first apparatus;
a development unit configured to apply the first development processing and the second development processing to the acquired RAW image;
a generation unit configured to generate a difference image indicating a difference between a first results image obtained by applying the first development processing and a second results image obtained by applying the second development processing; and
a transmission unit configured to transmit the generated difference image to the first apparatus.

19. An image processing method comprising the steps of:
applying development processing to an input RAW image;
acquiring a difference image indicating a difference between a first results image obtained by applying first development processing the same as the development processing to the RAW image and a second results image obtained by applying second development processing different from the first development processing to the RAW image,
wherein the development processing includes at least demosaic processing, demosaic processing in the first development processing is processing to estimate information on a color component that does not exist in a pixel of interest by an interpolation method, and demosaic processing in the second development processing is processing that uses a trained neural network; and
generating a third results image by applying development processing to the input RAW image based on the first results image and the difference image, wherein
a processing load of the second development processing is higher than that of the first development processing.

20. An image processing method comprising the steps of:
applying development processing to an input RAW image;
storing a results image indicating results of the development processing;
acquiring a difference image indicating a difference between a first results image obtained by applying first development processing the same as the development processing to the RAW image and a second results image obtained by applying second development processing different from the development processing to the RAW image,
wherein the development processing includes at least demosaic processing, demosaic processing in the first development processing is processing to estimate information on a color component that does not exist in a pixel of interest by an interpolation method, and demosaic processing in the second development processing is processing that uses a trained neural network; and
storing the stored results image in association with the acquired difference image or updating the stored results image by the acquired difference image.

21. An image processing method comprising the steps of:
applying first development processing and second development processing different from the first development processing to an input RAW image; and
generating a difference image indicating a difference between a first results image indicating results obtained by applying the first development processing and a second results image indicating results obtained by applying the second development processing,
wherein the development processing includes at least demosaic processing, demosaic processing in the first development processing is processing to estimate information on a color component that does not exist in a pixel of interest by an interpolation method, and demosaic processing in the second development processing is processing that uses a trained neural network.

22. A control method of an image processing system that develops a RAW image and which includes a first apparatus and a second apparatus, wherein
the first apparatus is controlled so as to perform the steps of:
applying development processing to an input RAW image;
storing a results image indicating results of the development processing;
acquiring a difference image indicating a difference between a first results image obtained by applying first development processing the same as the development processing to the RAW image and a second results image obtained by applying second development processing different from the development processing to the RAW image,
wherein the development processing includes at least demosaic processing, demosaic processing in the first development processing is processing to estimate information on a color component that does not exist in a pixel of interest by an interpolation method, and demosaic processing in the second development processing is processing that uses a trained neural network; and
updating the results image stored at the storage step based on the difference image, the second apparatus is controlled so as to perform the steps of:
acquiring a RAW image from the first apparatus;
applying the first development processing and the second development processing to the acquired RAW image;
generating a difference image indicating a difference between a first results image obtained by applying the first development processing and a second results image obtained by applying the second development processing; and
transmit the generated difference image to the first apparatus, and
a processing load of the second development processing is higher than that of the first development processing.

23. A non-transitory computer readable storage medium storing a program for causing a computer to perform an image processing method comprising the steps of:
applying development processing to an input RAW image;
storing a results image indicating results of the development processing;
acquiring a difference image indicating a difference between a first results image obtained by applying first development processing the same as the development processing to the RAW image and a second results image obtained by applying second development processing different from the development processing to the RAW image,
wherein the development processing includes at least demosaic processing, demosaic processing in the first development processing is processing to estimate information on a color component that does not exist in a pixel of interest by an interpolation method, and demosaic processing in the second development processing is processing that uses a trained neural network; and
updating the results image stored at the storage step by adding the acquired difference image, wherein
a processing load of the second development processing is higher than that of the first development processing.

* * * * *